United States Patent [19]
Krynytzky

[11] Patent Number: 5,627,312
[45] Date of Patent: May 6, 1997

[54] VARIABLE RESISTANCE VENTILATED ADAPTIVE WIND TUNNEL WALLS

[75] Inventor: Alexander J. Krynytzky, Seattle, Wash.

[73] Assignee: The Boeing Company, Seattle, Wash.

[21] Appl. No.: 577,982

[22] Filed: Dec. 22, 1995

[51] Int. Cl.$^6$ .................................................. G01M 9/04
[52] U.S. Cl. .................................................. 73/147; 73/865.6
[58] Field of Search .................................................. 73/147, 865.6

[56] References Cited

U.S. PATENT DOCUMENTS

| | | | |
|---|---|---|---|
| 2,560,634 | 7/1951 | Colley | 73/147 X |
| 2,933,922 | 4/1960 | Davis | 73/147 |
| 4,308,748 | 1/1982 | Jacocks . | |
| 4,398,415 | 8/1983 | Jacocks et al. | 73/147 |
| 4,493,217 | 1/1985 | Engler et al. . | |
| 4,592,229 | 6/1986 | Bütefisch et al. . | |
| 4,653,317 | 3/1987 | Schtäfer . | |
| 4,658,635 | 4/1987 | Pszolla et al. . | |
| 4,688,421 | 8/1987 | Pzsolla . | |
| 5,007,731 | 4/1991 | Bütefisch . | |
| 5,046,358 | 9/1991 | Wulf et al. . | |
| 5,365,782 | 11/1994 | Bouis et al. . | |

FOREIGN PATENT DOCUMENTS

| | | |
|---|---|---|
| 0027229 | 4/1981 | European Pat. Off. . |
| 0365799 | 5/1990 | European Pat. Off. . |
| 0572787 | 12/1993 | European Pat. Off. . |
| 3404696 | 4/1987 | Germany . |
| 3514437 | 1/1988 | Germany . |
| 9300944 | 1/1995 | Netherlands . |
| 2142290 | 1/1985 | United Kingdom . |
| 2177661 | 1/1987 | United Kingdom . |

OTHER PUBLICATIONS

Professor W. R. Sears, Cornell University, "Self Correcting Wind Tunnels," *Aeronautical Journal*, Feb./Mar. 1974, pp. 80–89.

*Primary Examiner*—Richard Chilcot
*Assistant Examiner*—Joseph L. Felber
*Attorney, Agent, or Firm*—William C. Anderson

[57] ABSTRACT

An adaptive wind tunnel wall system for minimizing aerodynamic wall interference for slotted or perforated wall test sections. In the present invention, a plurality of continuous or segmented flexible strips may be deflected by a number of actuators to control fluid flow from the test section to a plenum or plena surrounding the test section. The actuators move the continuous or segmented strips toward and away from the slotted or perforated test section walls along the length of the test section to easily change wall crossflow resistance.

31 Claims, 6 Drawing Sheets

VARIABLE RESISTANCE VENTILATED ADAPTIVE WIND TUNNEL WALLS

TECHNICAL FIELD

This invention relates to subsonic, transonic and supersonic wind tunnels for testing models in fluids at low and high speeds. More particularly, this invention relates to a variable resistance ventilated adaptable wind tunnel test section wall system where wall crossflow resistance may be easily controlled.

BACKGROUND OF THE INVENTION

It is well known that aerodynamic testing of a model, or an article, installed in a wind tunnel test section never truly represents the flow conditions of flight, i.e., the test article in an unbounded fluid stream. The boundaries of the test stream (the flow conditions at the wind tunnel walls) in the presence of a test model, such as a body, lifting wing, or wing-body combination produce extraneous velocity components in the fluid flow around the model. These wind tunnel wall interferences in the test section perturb the fluid flowing past the model requiting test data corrections. At least four generations of experimenters have routinely corrected both the magnitude and direction of the nominal onset air stream, resulting in modifications to the measured aerodynamic characteristics of the model (lift, drag, and pitching moment as a function of angle of attack). See, for example, "Low Speed Wind Tunnel Testing" by A. Pope, J. J. Harper (John Wiley Sons, Inc. 1966).

A number of proposals for simulating interference-free conditions or for minimizing wall interference effects within wind tunnels test sections have been proposed. See "Self Correcting Wind Tunnels" by W. R. Sears, *Aeronautical Journal*, February/March 1974, page 80. For example, it is well-known to use adaptive wall wind tunnels wherein deformable flexible solid test section walls form a substantially interference-free streamtube. In the ideal solution, arbitrarily deformable walls would provide; a complete adaptation, with the interference velocity field being identically zero everywhere in the vicinity of the model.

For airfoil, or so-called two-dimensional, testing, wherein a wing of constant cross-section spans a wind tunnel from one sidewall to the opposite sidewall, this can be achieved by deforming the floor and ceiling in simple streamwise curvature. This is readily achieved using flexible walls and a multi-jack wall positioning system. For arbitrary three-dimensional models (airplanes, non-lifting bodies, swept or tapered wings, etc.) this strategy can be employed to approximate an ideal interference-free streamtube by providing for wall deformation in streamwise strips, as exemplified by U.S. Pat. No. 4,308,748 issued to Jacocks, U.S. Pat. No. 5,046,358 issued to Wulf, et al., European Patent Applications 27,229A1, 365,799A2, and 572,787A1 of Wedemeyer, Amecke, et al. and Bouis, respectively.

Another approach for an adaptive wall wind tunnel includes the use of walls with controlled crossflow. In other words, instead of employing solid, or impermeable, walls, openings in the test section walls are provided to allow air to pass from the test section airstream into art external volume (i.e., a plenum) of nominally stagnant air, and back again depending on the pressure imposed by the model on the walls. Non-adaptive ventilated walls have been found to lessen wall interference, compared to closed wall non-adaptive tunnels, for an appropriate choice of global ventilation (meaning that wall openness is uniform throughout the test section). See Goethert, B. *"Transonic Wind Tunnel Testing"*, AGARDograph 49, Pergamon Press, 1961.

There are two main types of ventilated walls in common usage: perforated and slotted. Perforated walls have a uniform pattern of holes, drilled either normal to the wall surface, or at an angle of up to 60 degrees to the normal. Control of wall openness can be effected by providing a sliding or translatable perforated backing plate whose position determines the degree of wall openness, or porosity. This concept has been implemented in the AEDC 1T Transonic Wind Tunnel for each wall separately, and in the T128 Transonic Wind Tunnel run by TsAGI in Zhukovsky, Russia, which uses 128 independently slidable perforated backing plates which can vary wall porosity of each wall segment from 0% to 10%. UK Patent Application 2,177,661A provides another means of varying the resistance of perforated walls by utilizing individual movable plugs for each hole in the wall.

As will be understood to one of ordinary skill in the art, modifying the flow through ventilated walls can be done in such a way as to approximate the interference-free flowfield (due to the model) at the walls (determined by calculation for the model in question), and thus minimize the wall interference. By controlling the amount of airflow through the walls (i.e. crossflow), for example, by throttling the wall openings to restrict fluid flow from the test section to and from the surrounding plenum, a substantially interference-free streamtube can be formed in an analogous fashion to the solid flexible wall technique. In one approach, walls with separate segmented pressure plena freely communicate with the test section through ventilated surfaces, such as slotted or perforated wall surfaces. Each plenum pressure and therefore the flow through the walls can be separately controlled. See U.K. 2,142,290A Cook et at. In another approach, the test section walls are provided with mechanical elements that can vary the wall openness over local areas of the wall independently of each other, with all wall openings venting to a common constant pressure plenum chamber. Examples of this type of wind tunnel wall include the aforementioned T128 Tunnel and United Kingdom Patent Application 2,177,661A of Heddergott, et al. and DE 3,404,696 C2 of Amecke, et al In contrast to perforated walls which have perforations uniformly distributed over an entire wall surface, slotted walls have longitudinal slots in the walls separated by bands of impermeable material. The slots may be either open, or may have baffles, perforated inserts, or other flow resistance device within the openings. Wall interference of slotted walls is most simply modified by locally varying the width of each slot. The T1500 Transonic Wind Tunnel operated by FFA in Stockholm, Sweden, has provision for installation of slot inserts which provide the capability for arbitrary, but fixed, slot widths. There is no provision for automatic variability of slot width.

The present invention provides the means for adjusting the crossflow resistance of ventilated walls (either slotted or perforated) by utilizing a flexible throttle plate over each section of wall to be controlled. It has the advantage of providing a continuous variation of crossflow resistance in the streamwise direction, and thereby the ability for complete wall adaptation for interference-free flow, rather than being limited to a piecewise discontinuous approximation to the desired smooth variation of wall properties provided by a segmented variable porosity solution as in the Russian T128 Transonic Wind Tunnel.

The present invention has the advantage of fewer actuators, moving parts, and seals, providing a relatively simply and ostensibly more dependable operation than other controllable ventilated wall concepts, such as illustrated in UK patent Application 2177661A which requires a plug for each hole.

Adaptive ventilated wall tunnels with separate controlled plena have the disadvantage of requiring a complex pressure and vacuum air plant for plenum pressure control, rather than relying on the relatively simple mechanical actuation of the present invention.

The use of solid flexible walls for adaptive wall wind tunnels has been largely limited to two-dimensional testing, or to only partial adaptation due to the practical difficulty of bending a wall simultaneously in two directions, both longitudinally (streamwise) and laterally (cross-stream), which would be required for complete adaptation for three-dimensional models. This invention provides for lateral control variability by allowing adjacent throttle plates to be deflected independently.

SUMMARY OF THE INVENTION

An object of this invention is to provide the walls of a wind tunnel test section with substantially interference-free conditions.

Another object of the present invention is to provide variable resistance ventilated wind tunnel walls.

A further object of the present invention is to provide a ventilated wind tunnel test section where crossflow resistance may be easily varied.

In accordance with the foregoing, an adaptive wind tunnel crossflow modulation assembly for minimizing aerodynamic wall interference for slotted or perforated wall test sections is provided. The crossflow modulation assembly of the present invention comprises a plurality of continuous or segmented flexible strips that may be deflected by actuators for controlling fluid flow from the test section to a plenum surrounding the test section. The actuators move the continuous or segmented strips toward and away from the slotted or perforated wall test sections along the length of the test section to easily change local wall crossflow resistance and provide a wall with spatially variable crossflow properties.

BRIEF DESCRIPTION OF THE DRAWINGS

The foregoing and other features and advantages of the present invention will become more readily appreciated by reference to the following detailed description of an embodiment of the invention and the accompanying drawings wherein like numbers refer to the same or similar parts and wherein.

DETAILED DESCRIPTION OF THE PREFERRED EMBODIMENT

Figure 1:
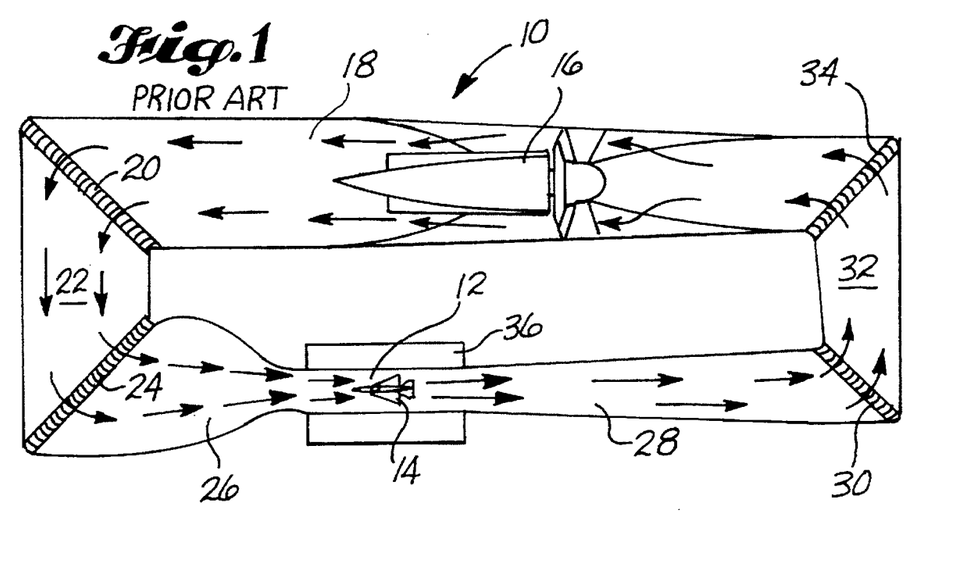
FIG. 1 is a planform view of a typical closed-circuit wind tunnel with a ventilated wall test section.
Figure 2:
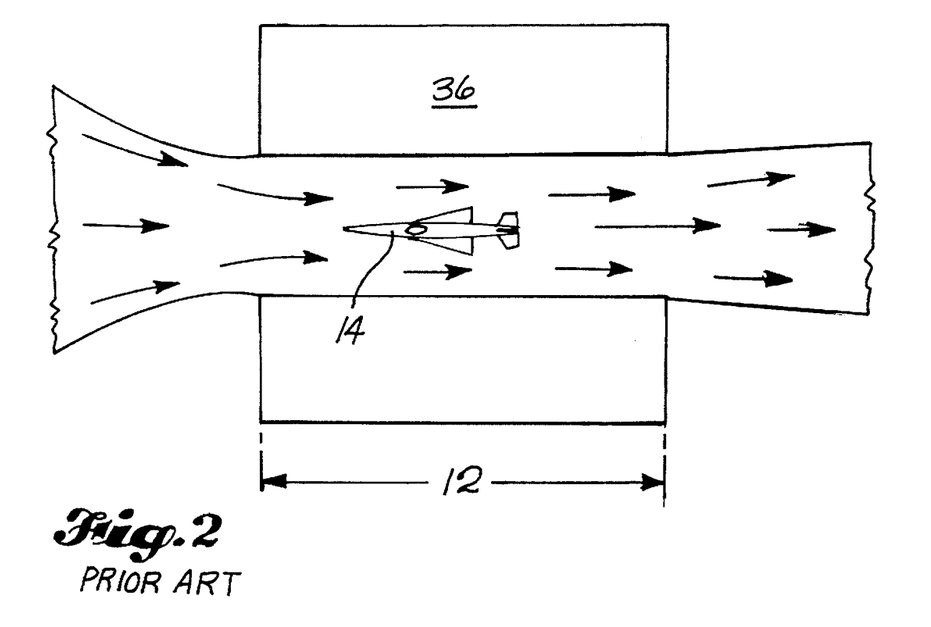
FIG. 2 is an enlarged view of the test section of the tunnel of FIG. 1.

Referring now to FIG. 1, there is shown a conventional closed-circuit ventilated wind tunnel 10 comprising a test section 12 in which is mounted a test model or an article 14. The model may be supported within the test section 12 in any conventional manner such as a sting and pitch strut support system or strut system of conventional design. A conventional fan or compressor 16 or other source of motive power, forces fluid, such as air, into a fan diffuser 18, through a plurality of turning vanes 20, first cross leg 22, a plurality of turning vanes 24, through a contraction section 26 to the test section 12. Fluid leaving the test section 12 passes into a test section diffuser 28, through a plurality of turning vanes 30, into a second leg 32, through a plurality of turning vanes 34 and back to the fan 16.

A pressure plenum 36 provides an equal pressure environment around the test section 12 into which fluid may ventilate. This "crossflow" in which fluid may pass from the test section 12 to the plenum is made possible by means of a plurality of open slots 38 (see FIGS. 3–5), a plurality of perforated strips 40 (see FIGS. 6 or 7) or perforations 42 (see FIG. 7) formed within the walls 44 of the test section 12. The open slots 38 and perforated strips 40 typically run longitudinally along the length of the test section 12 while the perforations 42 may be uniformly distributed throughout the test section 12.

Figure 3:
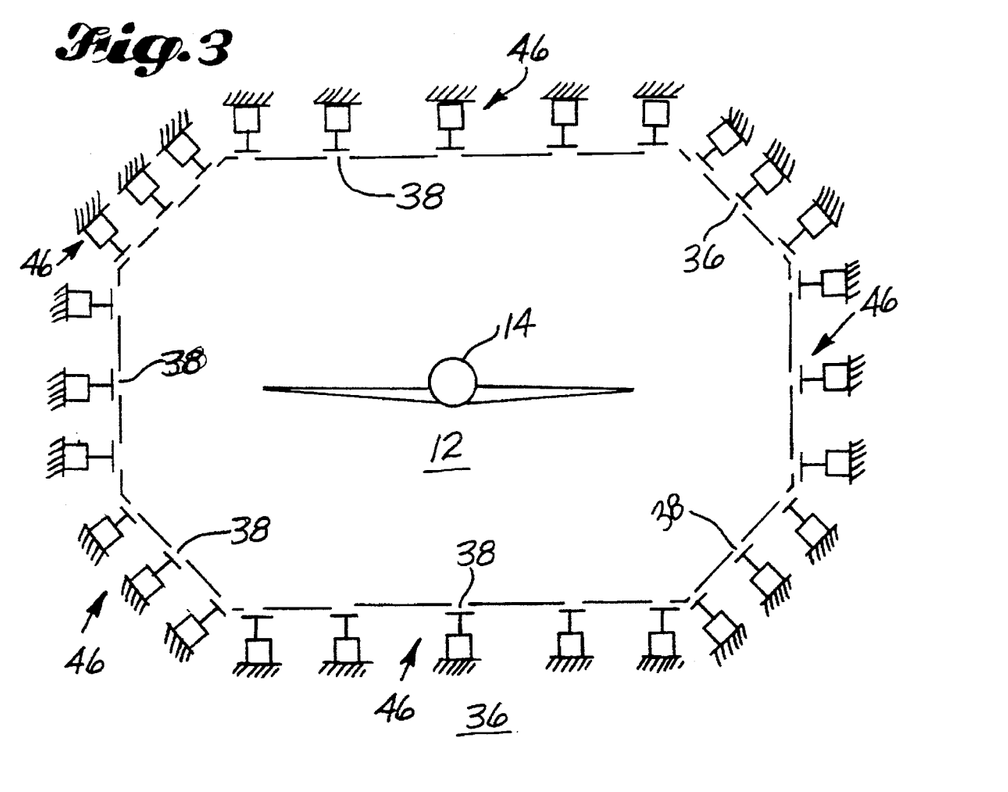
FIG. 3 is a cross-sectional view looking downstream of the test section of FIG. 2 incorporating the present invention.

The wind tunnel may have any cross sectional shape. For example, FIG. 3 illustrates a ventilated wind tunnel having an octagonal shape. Disposed about the periphery of the test section 12 within the plenum 36 is a plurality of crossflow modulating assemblies 46 of the present invention.

Figures 4, 5:
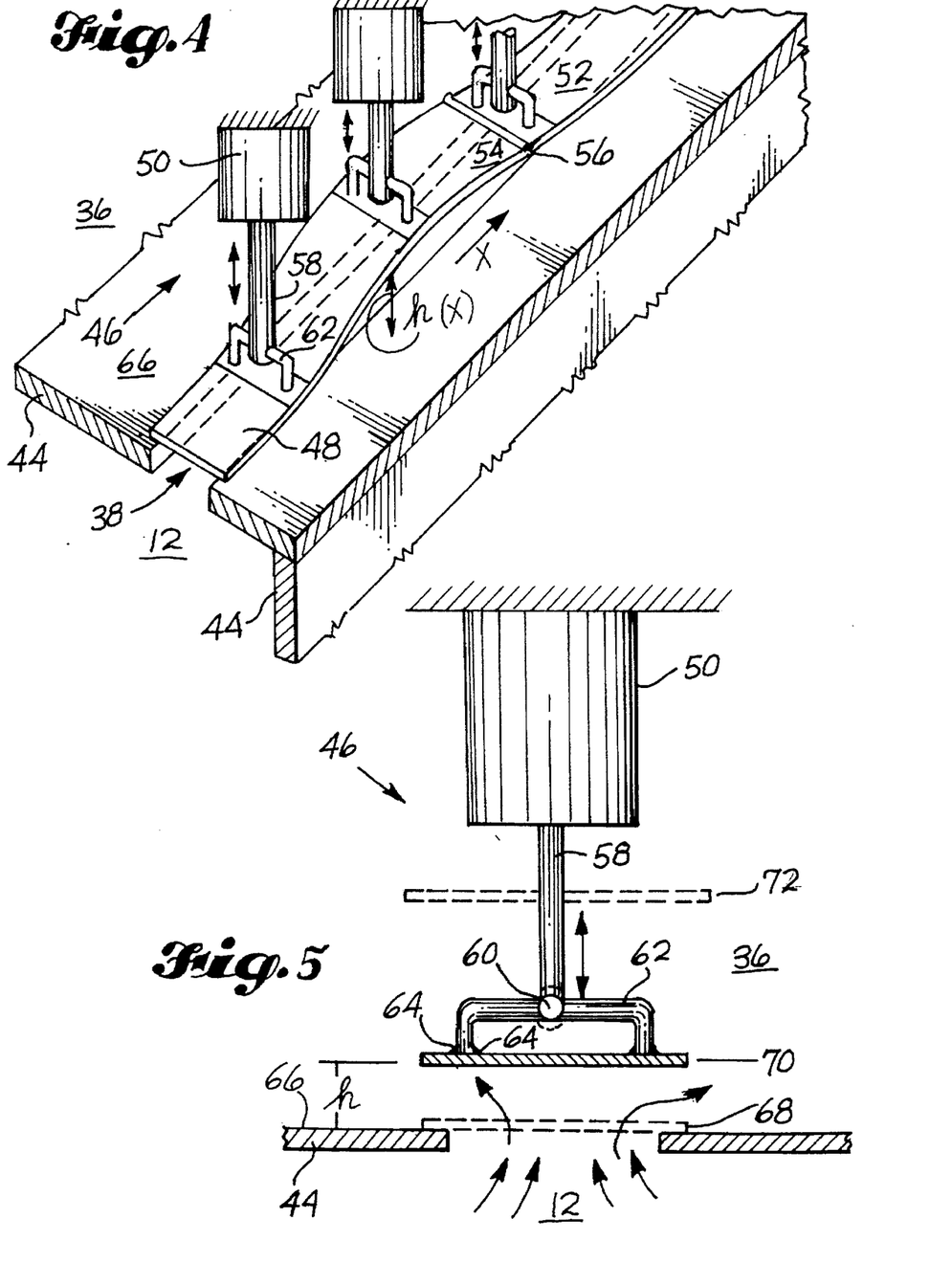
FIG. 4 is an enlarged isometric view of the longitudinal flexible plates used in the first embodiment of the present invention.
FIG. 5 is an enlarged view of a crossflow modulating assembly of the present invention used in the embodiment shown in FIG. 4.

As best shown in FIGS. 4 and 5, each crossflow modulating assembly 46 comprises a longitudinally elongated throttle plate, ribbon or strip 48 extending through the length of the test section 12 and a plurality of electrical, hydraulic or pneumatic actuators 50. Each throttle plate 48 is made of any flexible material and may be deflected along its length by the actuators 50 as will be better understood. Each throttle plate 48 may be continuous or segmented as at 52 and 54 where each segment is pinned as at 56 to adjacent segments 52, 54.

Each actuator 50 is affixed to appropriate structure(not shown) in the plenum and is provided with a translatable positioning rod 58 that is attached, such as by a wrist joint 60, to a yoke 62 or equivalent. The yoke is attached to the throttle plate 48 by any means such as, for example, ball joints or other appropriate mechanical joints 64. Each actuator 50 is capable of deflecting the portion of the throttle plate 48 to which it is attached whereby the plate may be moved towards or away from the plenum-facing surface 66 of a slotted wind tunnel wall 44.

In use, portions of each throttle plate 48 are deflected by the plurality of actuators 50 either to a first position 68 in abutting contact with the plenum-facing surface 66 of a slotted wind tunnel wall 44 or towards one of a variety of other positions 70 or 72 away from the surface 66. FIG. 5 shows the first position 68 and another position 72 in phantom whereas position 70 is shown in solid lines.

Each throttle plate 48 has a width greater than the width of an open slot 38. Thus, when a actuator 50 moves or deflects a portion of a flexible throttle plate into the first position 68, fluid flow or cross flow from the test section 12 to the plenum 36 is precluded. When a portion of throttle plate 48 is in another position, such as position 70 or 72, crossflow from the test section to the plenum may occur at varying amounts depending upon a dimension "h". Thus, crossflow resistance may be infinitely varied in accordance with the present invention in order to minimize boundary wall interference.

Figure 5A:
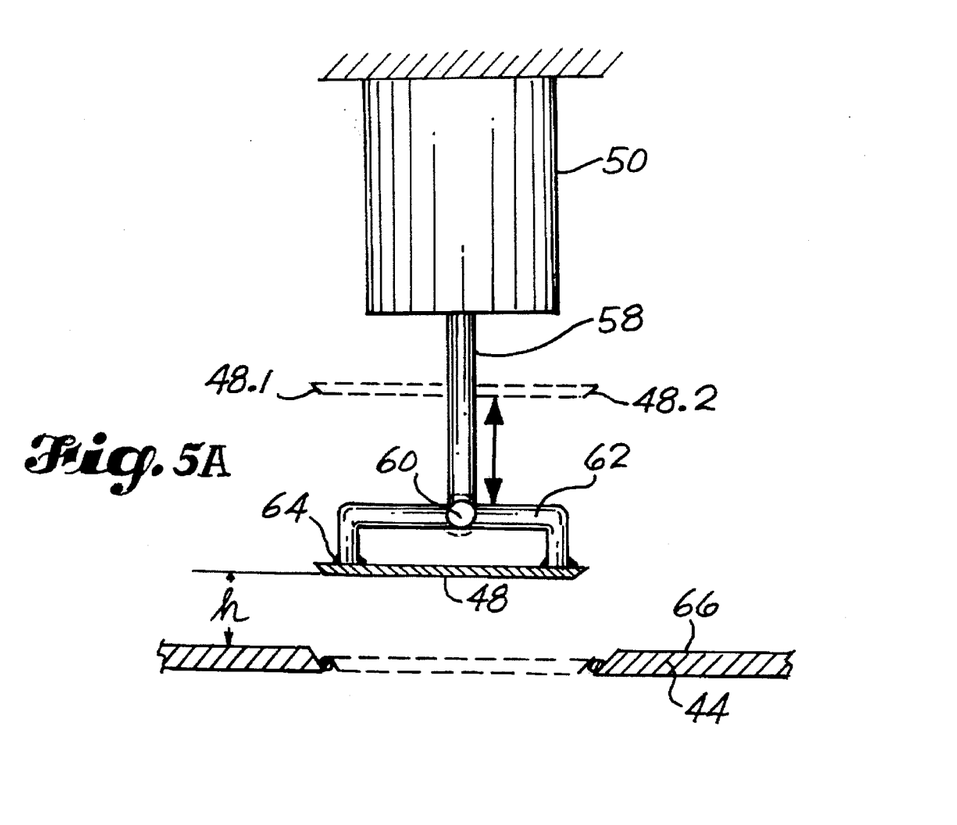
FIG. 5A shows an optional embodiment of FIG. 5.

The width of the throttle plate 48 may also be equal to the width of the slot 38 if a means of sealing the throttle plate 48 against the slot 38 is provided. For example, the slot 38 and the throttle plate 48 may be furnished with complementary beveled edges 48.1 and 48.2, as shown in FIG. 5A.

As suggested in FIG. 4, a throttle plate 48 is deflected some distance "h" from the wall 44 at a location "x" along the length of the plate 48. Thus, the deflected position "h" of the plate is a function of "x". At any point on the wall, the relationship between the amount of flow through the wall and the pressure imposed on the wall by the model depends oft the height "h" of the throttle plate 48. This relationship can be established by experimental measurements by one skilled in the art. Knowing the crossflow characteristics of the wall (as dependent on "h"), "h" can be set either according to a preset schedule based on model characteristics and estimated or measured model forces, or in an active mode applying the "self-correcting" wall concept described in Sears, above. The active mode would use measured wall pressures and iterate to a minimum interference in a manner similar to that described in U.S. Pat. No. 4,308,748, issued to Jacocks. However, in contrast to Jacocks, the present invention requires the use of the afore-mentioned ventilation crossflow characteristics, rather than depending on wall impermeability for calculation of the exterior and interior flows.

Figures 6, 9:
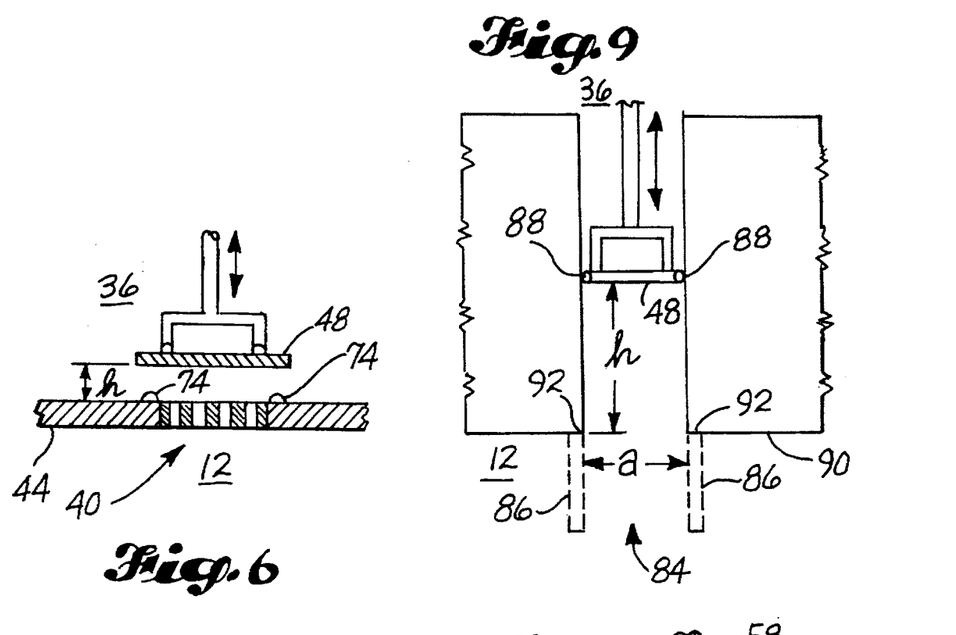
FIG. 6 is an enlarged view of a second embodiment of the present invention for slots with perforated inserts.
FIG. 9 is a cross sectional view of an embodiment for deep slots taken along lines 9—9 in FIG. 8.

In lieu of an open slot which may be rectangular in shape, a plurality of perforated strips or slot inserts 40 separated by bands of impermeable or solid wall material may be used to ventilate the test section 12 to the plenum 36. As shown in FIG. 6, an elongated elastomeric seal 74 may be longitudinally mounted on opposite sides of each perforated strip 40 on the plenum-facing surface 66. Such seals may also be implemented in the embodiments shown in FIGS. 5 and 5A. Alternatively, this seal 74 may be incorporated into the throttle plate 48. In use, an actuator 50 deflects one or more portions of the throttle plate 48 towards the surface 66 thereby modulating crossflow or fluid flow from the test section 12 to the plenum 36 at those portions.

The present invention is also applicable to wind tunnels having perforated test section walls 42. These walls 42 may vent to a single common plenum as in FIG. 6 or to compartmentalized plena whose depth is defined by the local position of a throttle plate 48.

Figure 7:
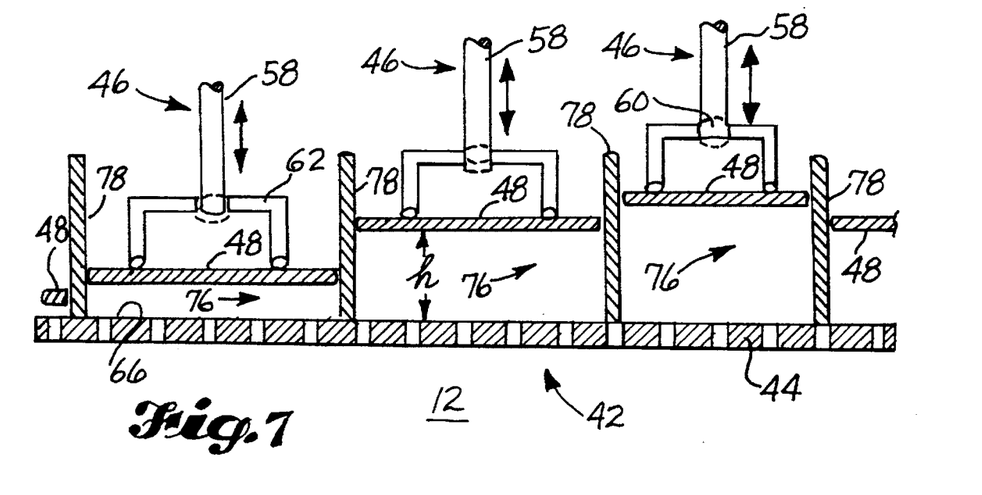
FIG. 7 is an enlarged view of a third embodiment of the present invention using controllable volume pressure plena.

For example, in FIG. 7, in order to vary the resistance (control the amount of crossflow) of a perforated wall, it may be desirable to isolate the operation of adjacent wall segments by a series of chambers or individual plena 76 formed on the plenum-facing surface 66 of the test section wall 44. Each chamber is formed by fins 78 attached to the surface 66 and extending away therefrom. Each fin 78 extends longitudinally throughout the test section 12. Each chamber 76 is bounded on one side by the throttle plate 48 and on the other side by the perforated wall 42. A crossflow modulating assembly 46 is positioned within and proximate to each chamber 76. Thus, separate plenum chambers of variable depth are formed by each throttle plate 48. Appropriate seals (not shown, but of the type shown in FIG. 9) may be disposed on the edges of each throttle plate 48. These seals may be required to preclude flow around the throttle plate 48.

Figure 8:
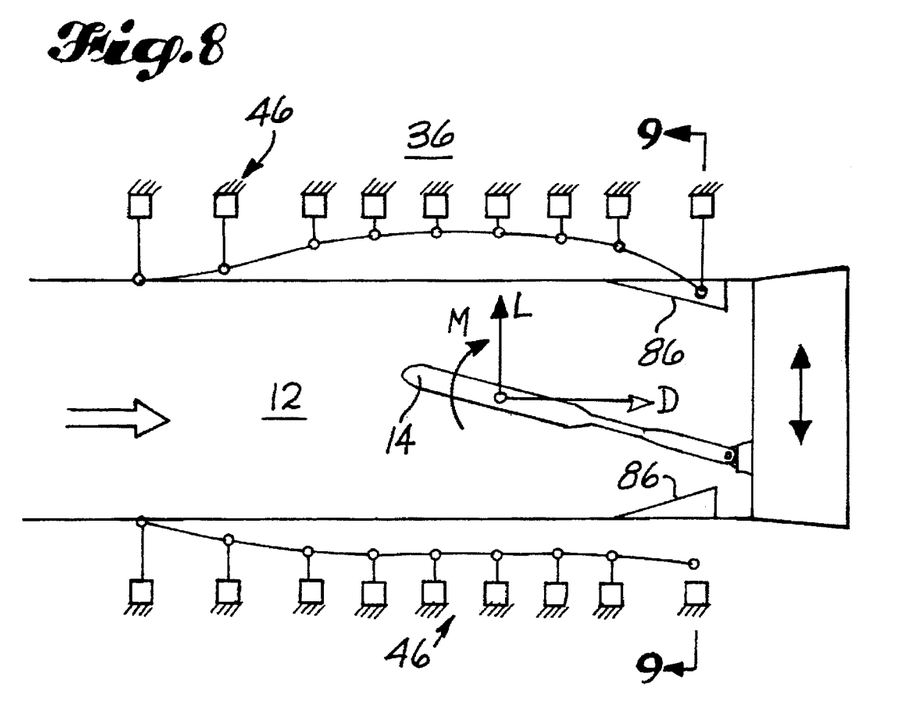
FIG. 8 is a side cross sectional view of the wind tunnel test section of the present invention showing the flexible plates deflected in a configuration for a subsonic high lift condition.

FIG. 8 shows a throttle plate configure, d for a subsonic high lift model test condition. In this case, a plurality of throttle plates 48, near the trailing edge of the test section 12, would be set to produce the interference-free downwash behind the model 14. It may be advantageous to extend a throttle plate 48 into the test section 12 downstream of a model 14 in order to maximize the achievable wall-induced downwash behind the model. To accomplish this, high lift channels 84 may optionally be defined in the test section by a pair of baffle or wiping plates 86 disposed on opposite sides or edges of an open slot 38. In use, a crossflow modulating assembly 46 deflects the aft portion of a throttle plate 48 into a channel 84. For a conventional lifting model 14 shown in FIG. 3, the wiping plates 86 would only be required in the top and bottom walls of the tunnel test section 12. To provide a smooth reentry of flow into the test section, each throttle plate 48 is provided with edge seals 88. This embodiment is shown for a deep slot application in FIG. 9.

Figure 9A:
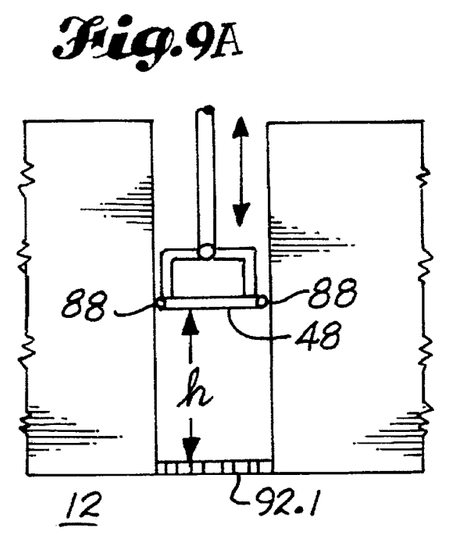
FIG. 9A and 9B show alternative embodiment of FIG. 9.
Figure 9B:
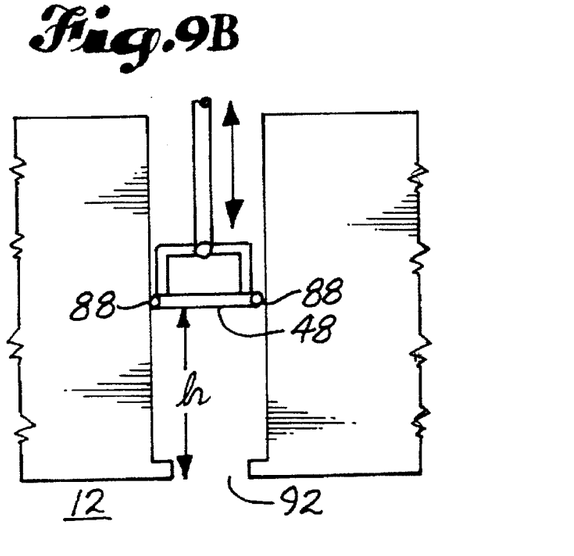

FIG. 9 shows a deep open slot embodiment of the present invention in which there is no external plenum in communication with the test section, but where the flow into the slot is modulated by the throttle plate 48 which varies the depth of the slot. This embodiment may alternatively include a slot opening 92 at the fixed test section wall 90 which is smaller than the width of the throttle plate 48, (see FIG. 9B) or a perforated slot insert 92.1 at this location 92 (see FIG. 9A).

Figure 10:
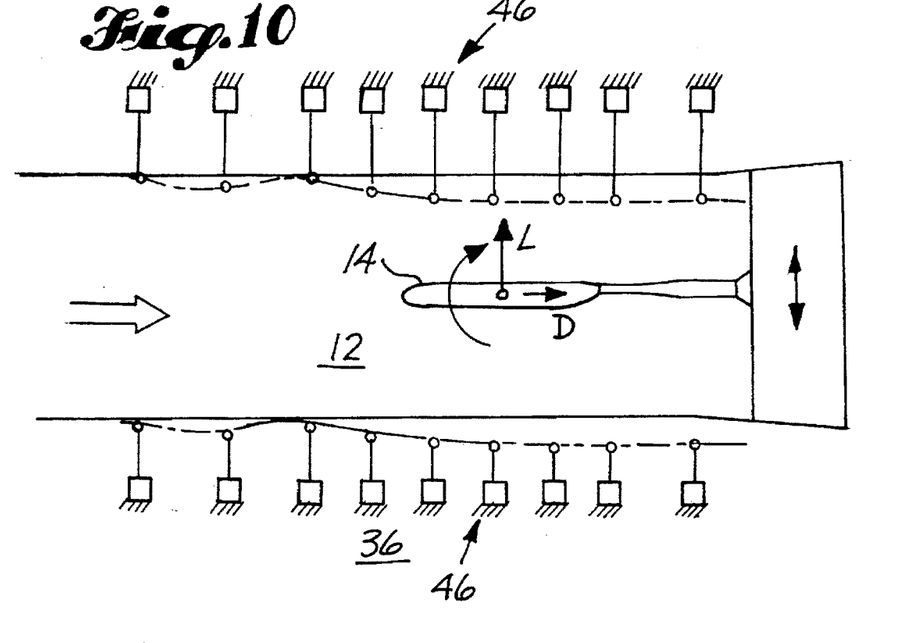
FIG. 10 is a side cross sectional view of the wind tunnel section of the present invention showing the flexible plates deflected in a configuration for supersonic flow forming.

The variable resistance ventilated wind tunnel test section walls of the present invention may also be used to optimize clear tunnel flow uniformity at supersonic Mach numbers. The crossflow modulating assembly of the present invention may be used in lieu of slot "coke-bottle" shaping (or perforation openness variation) for supersonic flow-forming downstream of a sonic throat, i.e., the start of the ventilated wall area. This type of tailoring is important for providing efficient expansion to a desired supersonic test Mach number. In doing so, the throttle plates 48 will have to be deflected into the "coke-bottle" shape such as shown in FIG. 10.

In addition, for a sufficiently large number of slots, or for perforated walls, the present means of adjusting wall openness can be expected to modify the wave reflection properties of the walls of the test section and thus improve the test environment for a model in a supersonic flow.

This invention has been generally de, scribed as being applicable to any ventilated wall wind tunnel. Further, the embodiments have been described in the context of a closed-circuit wind tunnel. The teachings of the present invention apply equally well to any wind tunnel having ventilated test section walls. However, the present invention would apply equally to any flow situation requiring the spatial modulation or control of flow through a ventilated wall surface. It should therefore be understood that the embodiments described are merely illustrative as there are numerous variations and modifications which may be made by those skilled in the art. Thus, the invention is to be construed as being limited only by the spirit and scope of the appended claims.

What is claimed and desired to be secured by Letters Patent of the United States is:

1. An adaptive wall wind tunnel test section for minimizing fluid flow interference effects at the wall of the tunnel when a test model is located in said test section, said tunnel comprising:

(a) wall means defining said test section, (b) a plenum surrounding said test section, (c) ventilation means for providing fluid communication through said test section wall means between said plenum and said test section, (d) flexible throttle plate means positioned proximate said ventilation means for controlling fluid flow from said test section to said plenum, said throttle plate means being deflectable from a first position precluding fluid flow from said test section into said plenum to another position permitting said fluid flow from said test section into said plenum, and (e) means for deflecting said throttle plate means from said first position to said another position.

2. The tunnel of claim 1, wherein said ventilation means comprises a plurality of open slots formed in said test section wall means, said slots extending longitudinally along said test section in the direction of fluid flow through said test section.

3. The tunnel of claim 2, wherein said slots are separated by bands of impermeable material forming said test section wall means, said bands having an internal surface exposed to said plenum, said throttle plate means comprising a plurality of longitudinal strips formed of a flexible material, each of said strips having a width greater than the width of each of said slots, whereby when a strip is deflected into said first position by said deflection means, said strip abuttingly contacts the internal surface of said bands thereby precluding fluid flow from said test section into said plenum.

4. The tunnel of claim 3, wherein said deflection means varies the position of said longitudinal strips with respect to said test section wall means along the length of said strips to vary the fluid flow from said test section to said plenum along the length of said test section.

5. The tunnel of claim 4, wherein said longitudinal strips are continuous.

6. The tunnel of claim 5, wherein said deflection means comprises a plurality of actuators pivotably attached to each of said strips along the length of said strips.

7. The tunnel of claim 4, wherein said longitudinal strips comprise a plurality of segments, each of said segments being pivotably coupled to adjacent segments.

8. The tunnel of claim 7, wherein said deflection means comprises a plurality of actuators pivotably attached to each of said segments along the length of said strips.

9. The tunnel of claim 2, wherein said slots are separated by bands of impermeable material forming said test section wall means, said bands having an internal surface exposed to said plenum, said throttle plate means comprising a plurality of longitudinal strips formed of a flexible material, each of said strips having a width equal to the width of each of said slots, each of said slots and said strips having complementary beveled surfaces, whereby when a strip is deflected into said first position by said deflection means, the beveled surface of said strip abuttingly contacts the beveled surface of said bands thereby precluding fluid flow from said test section into said plenum.

10. The tunnel of claim 1, wherein said ventilation means comprises a plurality of strips of perforations formed in said test section wall means, said perforated strips extending longitudinally along said test section in the direction of the fluid flow through said test section.

11. The tunnel of claim 10, wherein said perforated strips are separated by bands of impermeable material forming said wall means, said bands having an internal surface exposed to said plenum, said throttle plate means comprising a plurality of longitudinal ribbons formed of a flexible material, each of said ribbons having a width greater than the width of each of said perforated strips, whereby when a flexible ribbon is deflected into said first position by said deflection means, said ribbon abuttingly contacts the internal surface of said bands.

12. The tunnel of claim 11, wherein a longitudinal seal is mounted on said internal surface proximate each side of said perforated strips, whereby when said deflection means deflects said flexible ribbon into said first position, said ribbon abuttingly contacts each of said seals to preclude fluid flow into said plenum from said test section.

13. The tunnel of claim 12, wherein said longitudinal strips are continuous.

14. The tunnel of claim 13, wherein said deflection means comprises a plurality of actuators pivotably attached to each of said strips along the length of said strips.

15. The tunnel of claim 12, wherein said longitudinal strips comprise a plurality of segments, each of said segments being pivotably coupled to adjacent segments.

16. The tunnel of claim 15, wherein said deflection means comprises a plurality of actuators pivotably attached to each of said segments along the length of said strips.

17. An adaptive wall wind tunnel test section for minimizing fluid flow interference effects at the wall of the tunnel when a test model is located in said test section, said tunnel comprising:

(a) wall means defining said test section, (b) a plurality of plena surrounding said test section, (c) ventilation means for providing fluid communication through said test section wall means between each plenum and said test section, (d) flexible throttle plate means positioned within each plenum for varying the depth of each plenum whereby fluid flow from said test section to said plenum may be controlled, said throttle plate means being deflectable from a first position to another position, and (e) means for deflecting said throttle plate means from said first position to said another position.

18. The tunnel of claim 17, wherein said ventilation means comprises perforations in said test section wall means extending from said test section to said plena, said perforated test section wall means having an interior surface, and further comprising a plurality of longitudinal fins attached to each of said interior surfaces and extending longitudinally along said test section, said longitudinal fins defining said plena.

19. The tunnel of claim 18, wherein each said throttle plate means comprises a flexible strip movable within each of said plenum and extending longitudinally along said test section in the direction of the fluid flow through said test section.

20. The tunnel of claim 19, wherein said deflection means varies the position of said flexible strips with respect to said test section wall means along the length of said strips to vary the fluid flow from said test section to said plenum along the length of said test section.

21. The tunnel of claim 20, wherein said flexible strips are continuous.

22. The tunnel of claim 21, wherein said deflection means comprises a plurality of actuators pivotably attached to each of said flexible strips along the length of each of said flexible strips.

23. The tunnel of claim 20, wherein each of said flexible strips comprise a plurality of segments, each of said segments being pivotably coupled to adjacent upstream and downstream segments.

24. The tunnel of claim 23, wherein said deflection means comprises a plurality of actuators pivotably attached to each of said segments along the length of each of said flexible strips.

25. An adaptive wall wind tunnel test section for minimizing fluid flow interference effects at the wall of the tunnel when a test model is located in said test section, said tunnel comprising:

(a) wall means defining said test section, (b) a plurality of deep slots surrounding said test section, (c) ventilation means for providing fluid communication through said test section wall means between each of said slots and said test section, (d) flexible throttle plate means positioned within each deep slot for controlling fluid flow from said test section to each deep slot, said throttle plate means being deflectable from a first position precluding fluid flow from said test section into said deep slot to another position permitting said fluid flow from said test section into said deep slot, and (e) means for deflecting said throttle plate means from said first position to said another position.

26. The tunnel of claim 25, wherein said deep slots are substantially rectangular in shape and are provided with two longitudinal edges, a baffle plate extending longitudinally along each of said edges and projecting into said test section downstream of said test model.

27. The tunnel of claim 26, wherein said first position is proximate said longitudinal edges.

28. The tunnel of claim 26, wherein said throttle plate means may be deflected by said deflecting means through a deep slot into a third position within said baffle plate.

29. The tunnel of claim 25, further comprising a perforated wall insert disposed within each deep slot at said first position.

30. The tunnel of claim 25, further comprising a slot opening at test section wall means that is smaller than said throttle plate means.

31. The tunnel of claim 25, wherein said throttle plate means has the same width as any one of said deep slots.

* * * * *